United States Patent

Church et al.

Patent Number: 5,506,974
Date of Patent: Apr. 9, 1996

[54] METHOD AND MEANS FOR CONCATENATING MULTIPLE INSTRUCTIONS

[75] Inventors: Craig R. Church, Havertown; Jospeh S. Schibinger, Phoenixville; Andrew T. Jennings, West Chester, all of Pa.

[73] Assignee: Unisys Corporation, Blue Bell, Pa.

[21] Appl. No.: 115,454

[22] Filed: Sep. 2, 1993

Related U.S. Application Data

[63] Continuation of Ser. No. 498,281, Mar. 23, 1990, abandoned.

[51] Int. Cl.⁶ ........................................ G06F 9/28
[52] U.S. Cl. ..................... 395/375; 395/481; 395/650; 395/800; 364/DIG. 1
[58] Field of Search ........................... 395/375, 800, 395/425, 650

[56] References Cited

U.S. PATENT DOCUMENTS

| | | | |
|---|---|---|---|
| 3,461,434 | 8/1969 | Barton et al. | |
| 3,546,677 | 12/1970 | Barton et al. | |
| 3,548,384 | 12/1970 | Barton et al. | |
| 4,370,710 | 1/1983 | Kroft | 395/425 |
| 4,434,461 | 2/1984 | Puhl | 395/725 |
| 4,463,423 | 7/1984 | Potash et al. | 395/700 |
| 4,468,736 | 8/1984 | DeSantis | |
| 4,594,655 | 6/1986 | Hao et al. | 395/775 |
| 4,704,679 | 11/1987 | Hassler et al. | |
| 4,720,779 | 1/1988 | Reynard et al. | 395/700 |
| 4,773,041 | 9/1988 | Hassler et al. | 395/400 |
| 4,933,835 | 6/1990 | Sachs et al. | 395/425 |
| 4,980,821 | 12/1990 | Koopman et al. | 395/375 |
| 5,021,945 | 6/1991 | Morrison et al. | 395/375 |
| 5,043,870 | 8/1991 | Ditzel et al. | 395/425 |
| 5,280,615 | 1/1994 | Church et al. | 395/650 |

OTHER PUBLICATIONS

Briggs et al., *Computer Architecture and parallel Processing*, 1984, pp. 102–113.

Ryan, David P., Intel Corporation "Intel's 80960: An Architecture Optimized for Embedded Control", *IEEE Micro*, Jun. 1988, pp. 63–76.

*Primary Examiner*—William M. Treat
*Attorney, Agent, or Firm*—Ratner & Prestia

[57] ABSTRACT

A block structured data processing system concatenates block structured code so as to expedite the execution of less structured language code. The concatenation is performed in a code unit for a parallel pipeline processor so that the concatenated code can be executed in parallel. To optimize the access to the data associated with address couples, an address couple associative memory (ACAM) is provided for the translation of conventional address couples found in block structured systems into general registers numbers. The mechanism attempts to keep data in the general registers thus removing the requirement to re-fetch it from the memory system. To expedite the fetching of data arrays, descriptors may be stored in ACAM for use in continuously accessing data arrays in memory.

10 Claims, 6 Drawing Sheets

|  |  | JOB | TRIPLET |
|---|---|---|---|
| L1: | VALC I | | |
| | NAMC A | JOB 0 | 0 |
| | INDX | | |
| | DUPL | | 1 |
| | LOAD | JOB 1 | 2 |
| | VALC I | | |
| | NAMC 8 | JOB 2 | 3 |
| | NXLV | | |
| | VALC Z | | 4 |
| | MULT ) | | |
| | ) PAIR | JOB 3 | |
| | ADD ) | | 5 |
| | STOD | | |
| | VALC I | | |
| | ONE | | 6 |
| | ADD ) | | |
| | ) PAIR | JOB 4 | |
| | NAMC I ) | | 7 |
| | STON | | |
| | VALC N | | |
| | LSEQ | JOB 5 | 8 |
| | BRTR L1 | | |
| L0: | | | |

METHOD AND MEANS FOR CONCATENATING MULTIPLE INSTRUCTIONS

This application is a continuation of application Ser. No. 07/498,281, filed Mar. 23, 1990, now abandoned.

BACKGROUND OF THE INVENTION

1. Field of Invention

This invention relates to the concatenation of block structured code and more particularly to such concatenation for the execution of programs written in the FORTRAN programming language.

2. Description of the Prior Art

Most computer systems made to this day are of the conventional von Neumann organization which has remained relatively unstructured with the objective of being "general purpose." However, over the past two decades, better understanding has been achieved in the exploitation of the potential of block-structured programming languages that represent complex algorithms. Block structuring of algorithms, i.e., nested declarations, is a natural form for the expression of such complex algorithms.

A particular computer system that was designed to employ such block-structure, or nested languages, (and also nested data structures) is described in the Barton, et al., U.S. Pat. Nos. 3,461,434; 3,546,677 and 3,548,384. These patents describe a stack-oriented data processor where the stack mechanism, a first-in last-out mechanism, handles the flow of operators and associated parameters in a manner which reflects the nested structure of particular higher level languages that are designed to handle natural forms for the expression of complex algorithms. Such languages include ALGOL and ALGOL-type languages, such as PL/1, EULER, and so forth, which are based on the block-structuring of algorithms, i.e., nested declarations. While this may appear to impose unnecessary constraints on system development, the resulting products, measured in terms of throughput and flexibility, suggest that design "constraints" may really have been design opportunities (E. I. Organick, Computer System Organization, Academic Press 1973).

A system of the type described in the above-identified Barton patents is oriented around the concept of a segmented memory and specially treated segments called stacks. The processor runs in an expression stack; operators take their arguments from the top of the stack and leave their results on the top of the stack. The data addressing space of the executing program is mapped into the stack as well as other stacks linked to it and data items referenced by descriptors contained in the stack structure.

In addition to the better representation of complex algorithms by such block structured languages, a computer system specifically adapted for execution of such block structured code requires fewer memory cycles for fetching of instructions than in a comparable FORTRAN or COBOL program executed on a less structured computer system. In these other systems, corresponding instructions occupy a larger number of bits since they employ index registers and/or base registers (but not stack-base descriptors) for accessing data. In a stack machine, however, more memory cycles may be required for the accessing of data. As a result, standard FORTRAN programs execute more slowly than corresponding ALGOL-like programs on a block structured machine. The semantics of certain FORTRAN declarations are such that the use of these declarations effectively forces a compiler to allocate contiguous blocks of storage for arrays that fall under the purview of these declarations. This is because FORTRAN was designed for a fixed-address machine (i.e., the IBM 704).

In spite of the advantages of block structured programs and systems that expedite their execution, FORTRAN programming is still widely used throughout the computer field particularly in engineering and scientific areas requiring data access to a large number of individual array elements.

An attempt to expedite data processing in a less structured language by a block structured machine is described in Desantis et al., U.S. Pat. No. 4,468,736. In this patent, the block structured code is received in sequence and divided into independent or at least semi-independent queues of concatenated code for separate execution by separate processors. A particular disadvantage of the Desantis et al. mechanism is that it has no provision for handling restarts should a section of code call for a branch into code already assigned to one of the queues.

It is, then, an object of the present invention to provide an improved system and method for concatenation of block structured code to execute less structured language code.

It is another object of the present invention to provide an improved system and method for conversion of block structured code into execution code for FORTRAN statements.

It is still a further object of the present invention to convert block structured data references into general register addresses to reduce the number of memory accesses required.

SUMMARY OF THE INVENTION

In order to obtain the above identified objects, the present invention is directed toward a block structured data processing system and the method employed therein for concatenating block structure code so as to expedite the execution of less structured language code. Furthermore, the concatenation is performed in a code unit for a parallel pipeline processor so that the concatenated code can be executed in parallel. To optimize the access to the data associated with address couples, an address couple associative memory (ACAM) is provided for the translation of conventional address couples found in block structured systems into general registers numbers. The mechanism attempts to keep data in the general registers thus removing the requirement to re-fetch it from the memory system. To expedite the fetching of data arrays, descriptors may be referenced via the ACAM for use in continuously accessing data arrays in memory.

BRIEF DESCRIPTION OF THE DRAWINGS

The above and other objects, advantages and features of the present invention will become more readily apparent from a review of the following specification when taken in conjunction with the drawings wherein.

GENERAL DESCRIPTION OF THE INVENTION

A system which differs both from the above identified Barton patents and the Desantis et al. patent is described in Hassler et al. U.S. Pat. No. 4,704,679 and Reynard et al. U.S. Pat. No. 4,720,779. Both of these patents are directed toward a parallel pipelined processor which receives incoming code for concatenation of compatible code syllables for parallel execution by different functional units within the processor.

Figure 1:
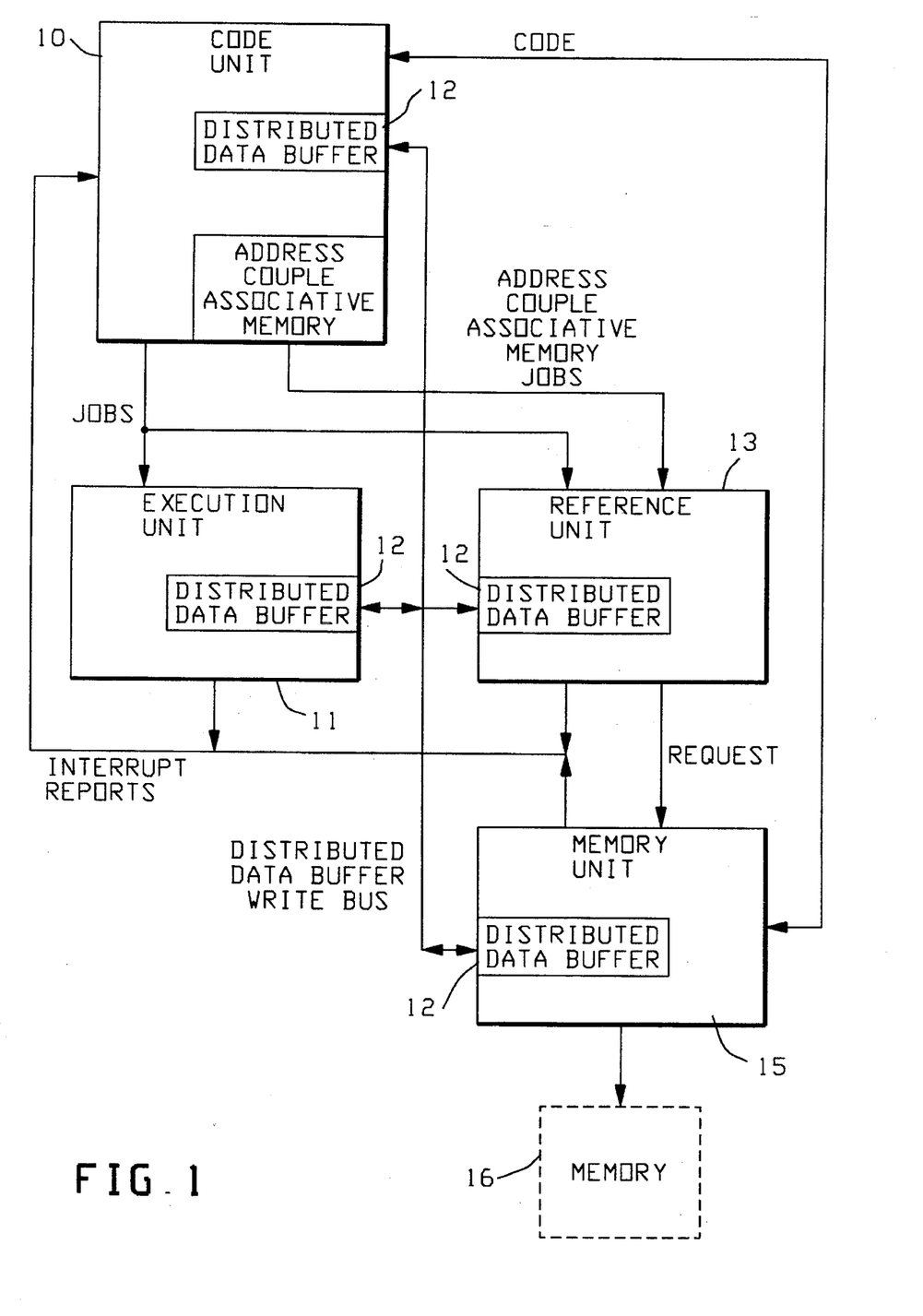
FIG. 1 is a block diagram of a parallel pipeline processor employing the present invention.

A processor employed in a preferred embodiment of the present invention is illustrated in FIG. 1. As shown therein, the processor includes a code unit 10 which receives sequences of program code syllables from memory 16 by way of memory unit 15 and supplies operators and parameters to execution unit 11 and reference unit 13. Each functional unit is provided with its own distributed data buffer 12 and the respective data buffers are connected together so that they always contain the same data. That is to say, should an entry in one of the data buffers be changed simultaneously for some reason, it will be changed in all the other data buffers.

Figure 2:
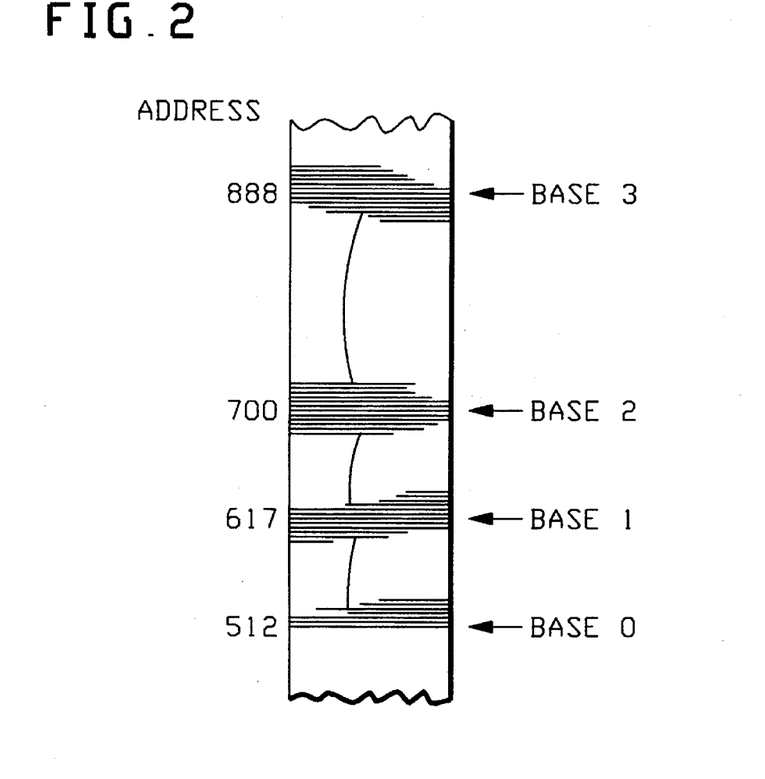
FIG. 2 is a diagram of a portion of memory containing data and code arranged as a push-down stack.

The manner in which the various data values and references to program code are structured into blocks or stacks is illustrated in FIG. 2. As shown therein, the data stack of FIG. 2 consists of four activation records defined by the four lexical levels 0–3. The actual addresses in memory of the respective base levels of the activation records are defined by address couples which consists of a lexical level or base address and an offset therefrom.

Each of the activation records in the stack portion of memory consists of an expression stack from which data is fetched for processing when the particular process is being run. It is understood that a process may contain many subprocesses and that each would have its own activation records. However, a portion of main memory exists outside of the stack area and is used for data arrays as is more thoroughly described below.

Figure 3:
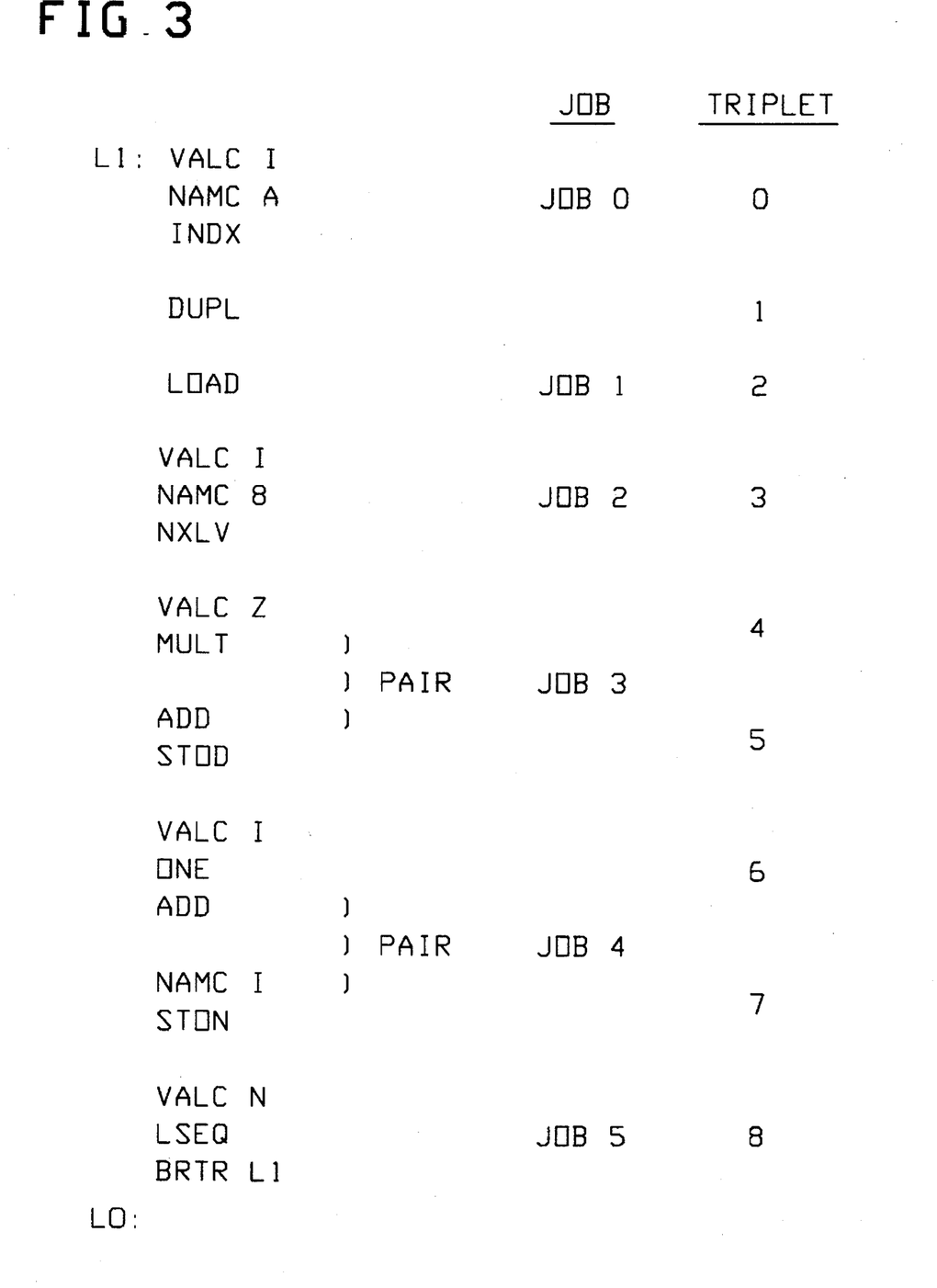
FIG. 3 is a listing of block structure code illustrating how it can be concatenated to implement a FORTRAN do loop.

In order to illustrate how block structured code is concatenated in the present invention for the execution of less structured program code, a sequence of such block structured code is illustrated in FIG. 3 which code is for the execution of a FORTRAN loop. This code is for the program segment:

```
DO 100 I=1, N

100 A(I)=A(I)+B(I)*Z
```

As indicated in the left hand column of FIG. 3 the first instructions of the code string are a value call or memory fetch of data item I, a name call of value A which instruction puts a reference to a data descriptor on top of the stack and the index instruction results in the creation of a pointer to array element A(I) which is in memory 16 of FIG. 1. The instruction LOAD is a memory fetch command which, in this instance, obtains the data value addressed by the indexed descriptor. The instruction pair VALC I, NAMC B fetches the value of the variable I and the descriptor for the data array from memory. The instruction NXLV causes an index operation and also the fetch of data in the array cell B(I). The instructions VALC Z, MULT and ADD perform the calculation A(I)+B(I)*Z and leave the results on the top of the stack. The STOD instruction stores a data item to the memory cell addressed by A(I) and deletes its stack inputs while STON Stores and leaves the data item on the stack for subsequent usage.

As illustrated in FIG. 3 the code is broken up into subsequences each of which is formed of a sequence of up to three operators (triplets) that can be concatenated for parallel execution by the processor of the present invention. Thus the entire sequence of code is divided into nine triplets identified by six so called Jobs which are entered into the respective pipelines of the processor of FIG. 1. It is noted that Job 3 and Job 4 are each formed of a pair of triplets which can be issued in sequence as a single Job. Triplets are issued to the other function units at twice the normal clock frequency of the processor, which, in the present invention is 32 MHZ. Thus, the triplets are issued at a rate of 64 MHZ.

A particular feature of program control unit 10 of FIG. 1 is the manner in which it can assign buffer registers in the various data buffers 12 provided with each of the functional units. Thus, returning to FIG. 3, while there can be a total of 12 memory references in the particular FORTRAN loop of FIG. 3, many of the references may be converted to refer to respectively assigned distributed data buffer registers instead of main memory storage locations. In each pass through the loop of FIG. 3, a minimum of 4 references to main memory storage locations is performed. These references are the memory fetch instructions LOAD and NXLV and 2 memory store operations: STOD and STON. Except for these 4 instructions, the various functional units of FIG. 1 operate out of their distributed data buffers 12 which, as was pointed out above, are configured so that each data buffer 12 always has the same contents as each of the other data buffers 12.

In FIG. 3, the various data items I, A, B, Z and N are actually address couples, referring to activation records in the stack, for addressing values stored in main memory. Provision is made in program control unit 10 to assign various registers in the respective data buffers to each address couple encountered during the execution of the FORTRAN loop of FIG. 3.

It is noted in FIG. 3, that, for the most part, each Job is formed of a triplet of operators. Code concatenation is a multistage process. The first stage, the scan level, forms operator triplets. The second stage, the concatenate level, determines if the triplet may be issued as one entity or if it must be broken down into a sequence composed of doublets and/or singlets. The last stage, the Job level, determines if successive triplets may be paired into a "super" Job such that a single Job number is assigned to the pair. The various instructions in a Job may be executed in parallel by different components of the processor.

The scanner forms operator triplets by parsing the code stream. For the purpose of scanning, operators are classified into the following categories:

a) ROP—Reference operators are VALC, NAMC, ZERO, ONE, LT8, LT16.

b) TOP—Terminal operators are STOD, STON, BRFL, BRTR, BRUN.

c) MOP—Major operators are all other operators.

The ROP operators may occupy between one and three syllables. The TOP operators are each one syllable operators and the MOP operators are generally one syllable operators.

The scanner forms triplets at twice the system clock rate (fast clock). The following rules determine triplet formation:

a) Six syllables maximum per triplet in a fast clock.

b) Eight syllables maximum per two triplets in a system clock.

c) The possible triplets are

1) ROP ROP MOP (or ROP ROP or ROP MOP or ROP or MOP)

2) ROP ROP TOP (or ROP TOP or TOP)
3) ROP MOP TOP (or MOP TOP)

LT8 and LT16 are eight-bit and sixteen-bit literal value instructions; BRFL tests a condition in the top of the stack and branches if the condition is false; BRTR causes a branch if the condition is true; and BRUN is an unconditional branch.

As was indicated above, the scanning and concatenation of the present invention is done in two levels and the code scanning can scan two program words of six syllables each from which it can select eight syllables for concatenation according to the above identified rules. This is distinct from the program scanner of the above referenced to Reynard et al. patent which only scans one word of six syllables and thus can not pick up many of the compatible operator combinations of FIG. 3. Most operators of FIG. 3 are only one 8 bit syllable although a number of the more complex operators such as VALC I are two syllable operators.

DETAILED DESCRIPTION OF THE INVENTION

Figure 4:
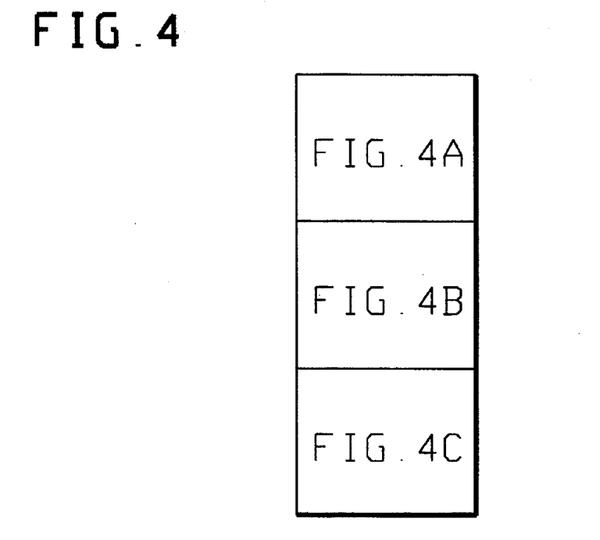
FIG. 4 is a block diagram illustrating the relation between FIGS. 4A–C.
Figure 4A:
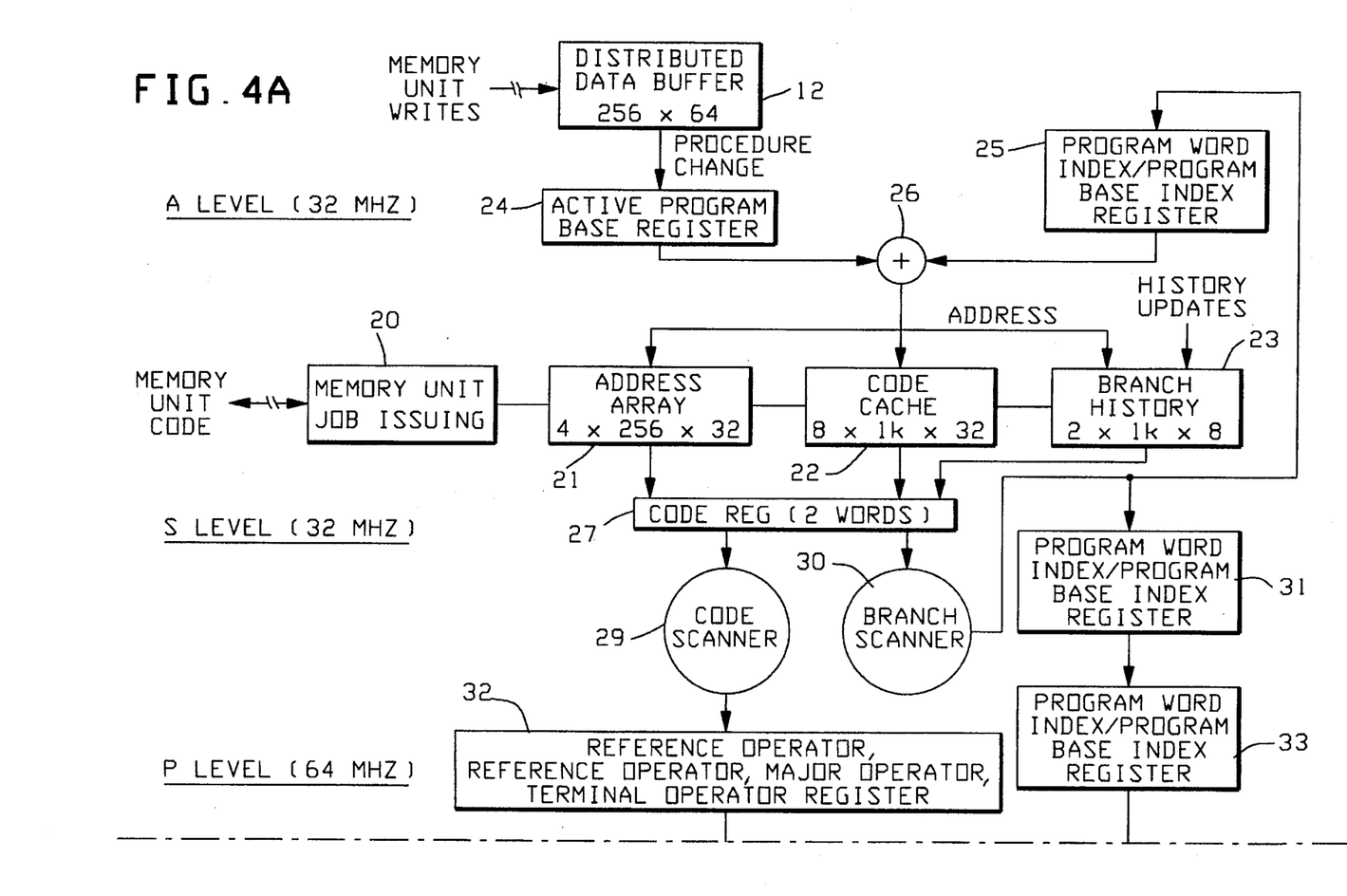
FIGS. 4A–C are schematic diagrams of the respective stages of a pipelined code unit of the present invention.
Figure 4B:
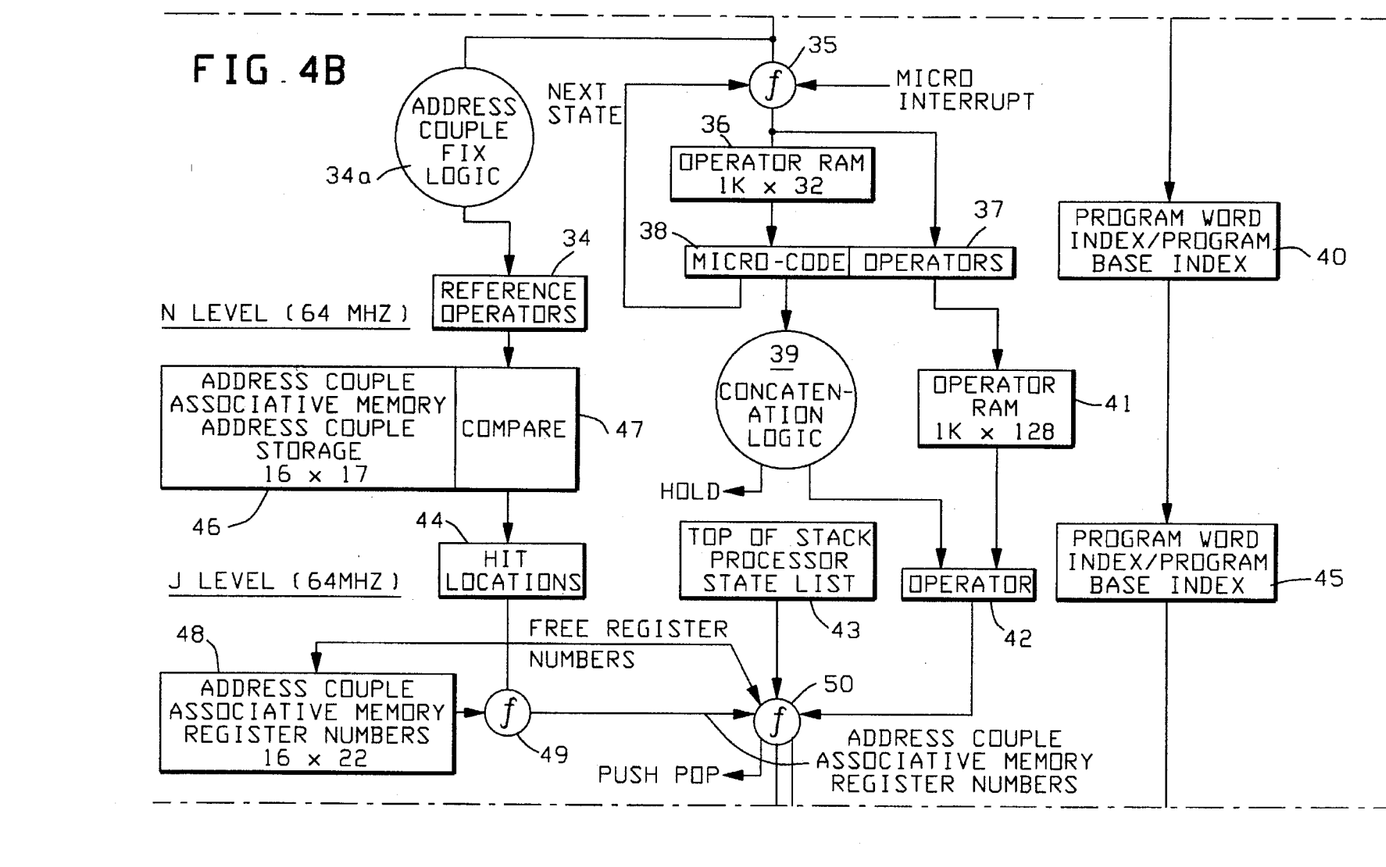
Figure 4C:
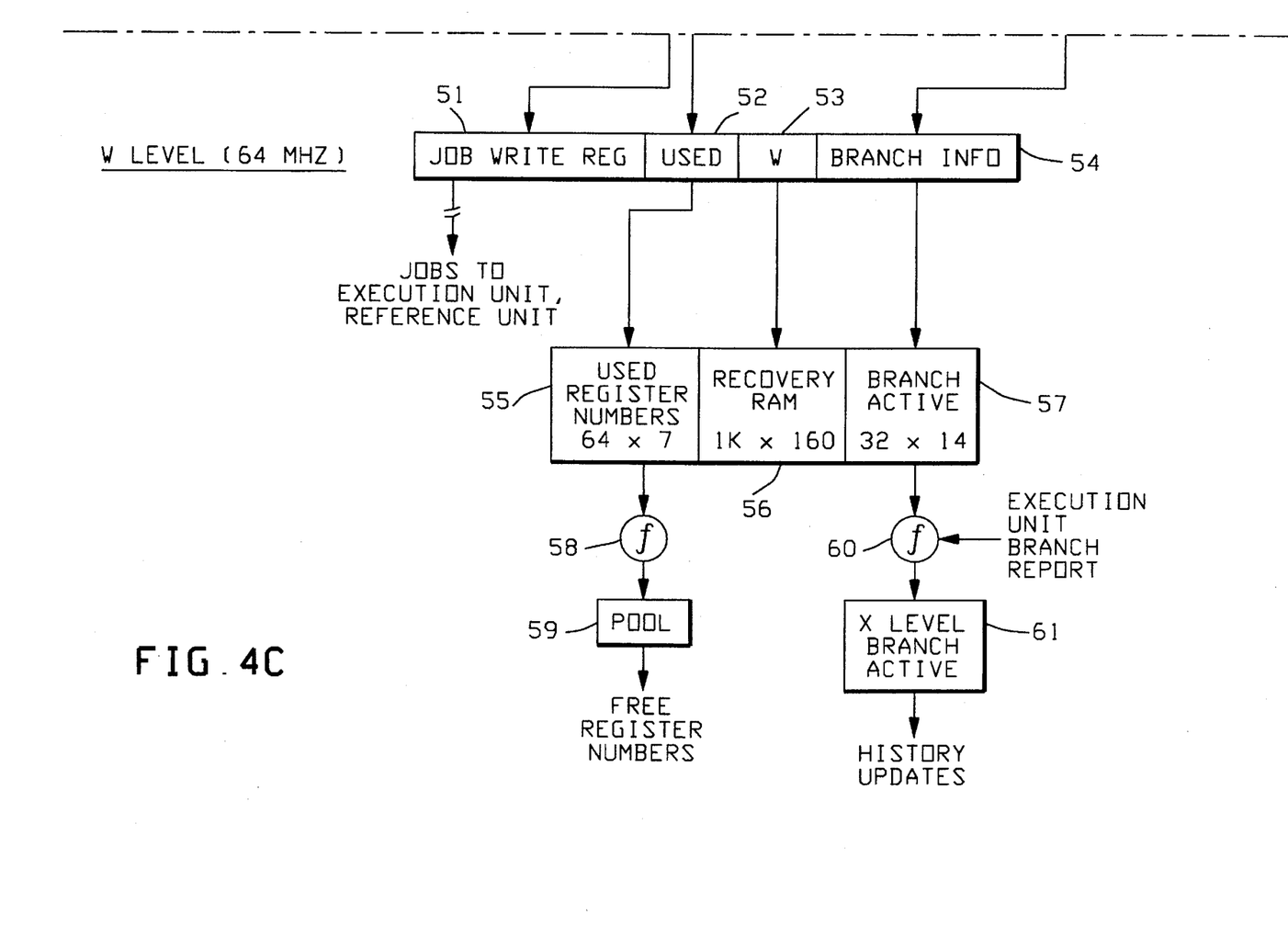

FIGS. 4A–C represent a detailed schematic of code unit 10 of FIG. 1. This schematic has been broken up into 3 sections as indicated in FIG. 4 and the respective sections really represent various function units and registers in a fashion illustrating the data flow and code flow from top to bottom.

Referring now to FIG. 4A, when a procedure change is required, the base address and offset of the procedure is received by distributed data buffer (DDB) 12. Code is received by Job issuing unit 20 from memory 16 of FIG. 1 by way of memory unit 15 of that Figure. This code is transmitted to code cache 22 and the memory address of that code is stored in address array 21 so that a check of address array 21 indicates what code is in code cache 22.

A branching mechanism may also be included in the present invention. Branch history unit 23 is used to predict the direction of conditional branch operators BRTR and BRFL. When a branch is executed, a new offset value for a given program word from branch scanner 30 is sent to PWI PSI register 25.

Code is received from code cache 22 by code register 27 by way of a 96 bit bus so that code register 27 receives two words of six 8 bit syllables in parallel. PWI PSI register 31 receives the program word index and program syllable index for the words in code register 27. These indices are transferred on down the various levels as the corresponding code is transferred on down the pipeline. Code scanner 29 scans the 12 syllables in code register 27 and can transfer up to eight such syllables to ROP ROP MOP TOP register 32. per 32 MHZ clock.

Code scanner 29 scans the contents of code register 27 in an attempt to detect those syllables which are compatible for concatenation according to the above described rules. The detected syllables are then transferred to ROP ROP MOP TOP register 32. The remaining syllables in code register 27 are then scanned on the next cycle for transfer as another triplet. At the same time, the contents of register 31 are transferred to register 33.

The first level thus described is referred to as the "A" level and respective levels that continue on down the schematic of FIGS. 4A–C represent various levels in a synchronized pipeline.

Referring now to FIGS. 4B and 4C, up to two reference operators including their address couples can be transferred in parallel to ROPS register 34.

The major operators (MOP) and terminal operators (TOP) are transferred via combinatorial logic 35 to operator RAM 36 which generates microcode that is transferred to micro register 38. If the operator is a major operator only or a terminal operator only then only microcode for that operator is transferred to micro register 38. However, if there is a combination of a major operator and a terminal operator, then the microcode for both is transferred to register 38. Either way, the output of logic function unit 37 is also sent to operator register 37. The microcode in micro register 30 is checked by concatenation logic 39 to make certain it is a legal concatenation and if not, the triplet is broken up by being transferred back to logic function unit 35. Most of the time however the concatenation will be a legal combination and then the operator or operators in operator register are transferred to operator RAM 41 the output of which is transferred to operator register 42. In a preferred implementation of the disclosed invention, the microcode transferred out of the operator RAM 36 is only a partial representation of the corresponding operator or operators. Thus, only a partial examination of this information is made to assure correctness. The output of operator RAM 41 is the full microcode required for transmission to the respective function units of FIG. 1. In the meantime, the contents of register 40 of FIG. 4B are transferred to register 45.

In an exemplary implementation of the disclosed invention, before the single or double reference operators are received by ROPS register 34 (which may simply act as a delay element), they pass through address couple fix logic 34a which assures that the address couple is in a fixed form. That is to say, the address couple can have a variable size lambda (lexical level) and delta (displacement) field which are each converted to have a fixed size.

The single or double reference operators are then sent to compare unit 47 of address couple associative memory 46. This is done to determine if the reference operators have an address couple in the ACAM.

If there is a memory "hit" (i.e. the address couple exists in associative memory 48) then the address couple's associated register number along with the major operator's or terminal operator's microcode is transferred to Job write register 51 from functional logic 50 and from associative memory 48 of FIG. 4B. Job write register 51 transfers the operators to execution unit 11 of FIG. 1 along with the corresponding register number.

If there is no such address couple in the associative memory 46, the address couple is inserted at an empty location in the ACAM 46. In an exemplary implementation of the disclosed invention, if no empty location exists in the ACAM46, the location in the ACAM 46 at which the insertion occurs is randomly selected. A free register number from the DDB 12 is assigned to that address couple from free register number pool 59. When a register number from the DDB 12 has been supplied to a new address couple, that number is received from function logic 50 of FIG. 4B by used register 52 as used in the used register number unit 55. When a register in the DDB becomes free it's number is transferred by way of functional logic 58 to free register number pool 59 from which unused register numbers can be supplied back to functional logic 50 of FIG. 4B and to associative memory 48 of that Figure. After the register number has been assigned, the assigned register number and its corresponding address couple are supplied to Job write register number 51 from functional logic 50. This address couple fetch job is then sent on to reference unit 13 of FIG. 1 which creates the absolute address for addressing memory to obtain that address couple. In an alternative embodiment of the disclosed invention, the ACAM 46 may be replaced by a cache-type memory structure and data is stored directly in the cache-type memory structure (as opposed to the storage of data addresses as described above). Data represented in the cache memory is produced for further processing when a "hit" occurs. Data, not in the cache, is retrieved from main memory for further processing and stored in the cache memory for late use.

Top of stack, PSL unit 43 contains the register numbers of those registers in the distributed data buffer 12 which serve as top of stack registers and also contains the processor state list for the current process.

A facility is included for saving the state of the Code Unit (CU). This is useful for situations such as error recovery. W field 53 notes the state of the code unit and stores that information in Recovery RAM 56.

With the provision of the address couple memory units as described in relation to FIG. 4B, memory references are not required for value calls, but rather the value of I is fetched from a DDB register associated with its address couple in the ACAM and is incremented and stored in the distributed data buffer using the register number. It is noted in FIG. 3, that this fetch incrementation and store are achieved by the concatenated operators VALC I, ONE, ADD, NAMC I, and STON. When the sequence of FIG. 3 is completed, it is noted that the last operator is the branch true operator BRTR which causes a branch back to the beginning of the entire sequence denoted as L1.

The program word index and program syllable index from register 45 of FIG. 4B are supplied to branch information register 54. If functional logic 60 receives a branch report, functional unit 60 then transfers the output of branch active unit 57 to branch active register 61 for transfer back to branch history unit 23 of FIG. 4A.

EPILOGUE

A code unit has been provided which allows for the concatenation of block structured code so as to expedite the execution of code sequences in a less structured language such as FORTRAN or COBOL. Furthermore, an associative memory mechanism has been provided which associates an address couple for addressing main memory with the register number of a register in a distributed buffer, the value of which can be accessed in place of the value in main memory when required so as to minimize the number of memory fetches required by executing the routine such as a FORTRAN loop.

While but one embodiment of the present invention has been described, it is apparent to those skilled in the art that variations and modifications may be made therein without departing from the spirit and the scope of the invention as claimed.

What is claimed:

1. In a stack oriented computer system including a source of a plurality of instructions having a plurality of address couples which are used to address operands, an address coupled associative memory (ACAM) which associates the address couples with registers that are identified by respective register numbers and in which data values are stored, including:

a) memory means for storing said plurality of instructions in a stack configuration;

b) storage means for concurrently storing ones of said plurality of address couples;

c) grouping means for forming a group from said plurality of instructions from said memory means, said group comprising at least three of said plurality of instructions;

d) determination means for determining, based on a set of predetermined rules, if the instructions in the group are to be issued for execution in parallel as a single job or if the group is to be divided into two subgroups comprised of one of said instructions, and two of said instructions, respectively, and issued for execution as two separate jobs wherein said two of said instructions are to be issued for execution in parallel;

e) dividing means for dividing the group of said plurality of instructions into two subgroups responsive to the determination made by the determination means;

f) comparing means for receiving one of a) said group and b) said two subgroups and for determining if each of the plurality of address couples is stored in the ACAM;

g) retrieval means, coupled to the ACAM, for providing register numbers which correspond to ones of the address couples stored in the ACAM, respectively;

h) address couple associating means for storing a further address couple in said ACAM and for associating said further address couple with one of said registers if said comparing means has determined that said further address couple has not already been stored in the ACAM; and i) execution means for executing said at least three of said plurality of instructions as one of a) said single job and b) said two separate jobs based on said determination made by said determining means following addressing of said operands using said register numbers.

2. A stack oriented computer system according to claim 1 wherein said retrieval means provides register numbers corresponding to ones of said address couples and said address couple associating means associates said further address couple with one of said registers concurrently.

3. A stack-oriented computer system according to claim 1, wherein each of said plurality of address couples comprises two fields: one field designates a lexical level and the other field designates a displacement therefrom.

4. The means of claim 3 wherein said two fields are of variable size.

5. The means of claim 4 which further comprises an address couple fix logic means for making the size of each of the two fields fixed.

6. A stack-oriented computer system according to claim 1, wherein each of said plurality of instructions is selected from the group consisting of a reference operator (ROP), a terminal operator (TOP) and a major operator (MOP) and wherein each of said plurality of computer instruction groups is selected from the further group consisting of ROP ROP MOP, ROP ROP ROP, ROP ROP MOP, ROP, MOP, ROP ROP TOP, ROP TOP, TOP, ROP MOP TOP, and MOP TOP, wherein said reference operator includes one of a value call operator, a name call operator and a literal value, said terminal operator includes one of a store operator and a branch operator and said major operator includes an operator not included in said reference operator and said terminal operator.

7. A stack-oriented computer system according to claim 1, further including means for combining said group of said plurality of instructions and a successive group of said plurality of computer instruction groups which succeeds said group to form a computer instruction group pair if said successive group processes a data value generated by said group.

8. A stack-oriented computer system according to claim 1, further comprising:

determination means for determining if said group and a successive group of ones of said plurality of instructions successive to said at least three of said plurality of instructions are to be paired for execution and issued as a super job; and pairing means for pairing said group and said successive group for execution based on the determination made by said determination means.

9. A stack-oriented computer system according to claim 1, wherein said grouping means forms said group to include a first sequence of instructions and a second sequence of instructions wherein said first sequence of instructions includes one or more reference operator instructions wherein each reference operator includes one of a value call operator, a name call operator, and a literal value.

10. A stack-oriented computer system according to claim 9, wherein said second sequence includes one of: a sequence including a major operator instruction, a sequence including a terminal operator instruction and a sequence including a major operator and a terminal operator instruction.

\* \* \* \* \*